(12) United States Patent
Li

(10) Patent No.: US 10,830,424 B1
(45) Date of Patent: Nov. 10, 2020

(54) BRACKET FOR LIVE BROADCASTING

(71) Applicant: Shenzhen Youbaise Technology Co., Ltd., Shenzhen (CN)

(72) Inventor: Dinglan Li, Shenzhen (CN)

(*) Notice: Subject to any disclaimer, the term of this patent is extended or adjusted under 35 U.S.C. 154(b) by 0 days.

(21) Appl. No.: 16/395,275

(22) Filed: Apr. 26, 2019

(51) Int. Cl.
| | | |
|---|---|---|
| *F21V 33/00* | (2006.01) | |
| *F21V 21/32* | (2006.01) | |
| *F21S 9/02* | (2006.01) | |
| *F21V 23/06* | (2006.01) | |
| *G02B 7/182* | (2006.01) | |
| *F16M 13/02* | (2006.01) | |
| *F16B 5/06* | (2006.01) | |
| *F16M 11/40* | (2006.01) | |

(52) U.S. Cl.
CPC ............ *F21V 21/32* (2013.01); *F16B 5/0621* (2013.01); *F16M 11/40* (2013.01); *F16M 13/022* (2013.01); *F21S 9/02* (2013.01); *F21V 23/06* (2013.01); *G02B 7/182* (2013.01)

(58) Field of Classification Search
CPC ......... F21V 21/32; F21V 23/06; G02B 7/182; F16M 13/022; F16M 11/40; F16M 2200/08; F16M 2200/068; F21S 9/02; F16B 5/062
See application file for complete search history.

(56) References Cited

U.S. PATENT DOCUMENTS

| | | | | |
|---|---|---|---|---|
| 6,311,936 B1* | 11/2001 | Herr | ........................ | D06F 39/12 |
| | | | | 248/68.1 |
| 2010/0039792 A1* | 2/2010 | Meyers | ................... | F21S 6/002 |
| | | | | 362/253 |
| 2014/0285993 A1* | 9/2014 | Fisher | .................... | G03B 15/03 |
| | | | | 362/16 |
| 2018/0119876 A1* | 5/2018 | Smolinski | .............. | F16M 11/40 |

* cited by examiner

*Primary Examiner* — Y M. Quach Lee

(57) ABSTRACT

A bracket for live broadcasting comprising a base, a clip body for holding a terminal device is detachably connected to the base, a mirror detachably connected to the base and a fill light detachably connected to the base. The effect of live broadcasting can be improved by using the bracket.

14 Claims, 4 Drawing Sheets

BRACKET FOR LIVE BROADCASTING

FIELD OF THE INVENTION

The present invention relates to a bracket, and more particularly, to a bracket for live broadcasting.

BACKGROUND OF THE INVENTION

Most people use a terminal device for video live. If the ambient light is insufficient, a fill light may be needed to supplement the light. Sometimes, the live broadcaster needs to know his or her expression or status in a mirror. At present, the mirror, the fill light and the clip are fixed by carriers alone, which will affect the effect of live broadcasting.

SUMMARY OF THE INVENTION

In view of the problems of the prior art, the primary object of the present invention is to provide a bracket for live broadcasting to improve the effect of live broadcasting.

The bracket for live broadcasting comprising a base, a clip body for holding a terminal device is detachably connected to the base, a mirror detachably connected to the base and a fill light detachably connected to the base.

Preferably, the clip body, the mirror and the fill light are detachably connected to the base by a connecting member respectively.

Preferably, the connecting member is a pipe body.

Preferably, the pipe body can be bent.

Preferably, the pipe body is a hose.

Preferably, the fill light is electrically connected to a data line.

Preferably, a rechargeable battery module housed in the base, a charging interface disposed on the base is electrically connected to the rechargeable battery module, the data line can be inserted into the charging interface to deliver electrical energy of the rechargeable battery to the fill light.

Preferably, a rechargeable battery module housed in the base, a hot shoe connector is arranged on the base, a hot shoe is arranged on the connecting member connected to the fill light, the hot shoe is connected to the hot shoe connector to enable the rechargeable battery module to supply power to the fill light.

Preferably, the base is provided with two cold shoe connectors, the other two of the connecting members are respectively provided with cold shoe, one of the cold shoes is connected to one of the cold shoe connectors.

Preferably, each of the connecting member is provided with a locknut, the locknut locks the hot shoe to the hot shoe connector or locks the cold shoe to the cold shoe connector.

Preferably, the hot shoe connector and the cold shoe connector include a connecting portion respectively, a screw is coupled to the connecting portion to fix the hot shoe connector or the cold shoe connector on the base.

Preferably, the connecting portion extends from the surface of the base into the base, the connecting portion is sleeved with a pressing ring, the screw connects to the connecting portion while fixing the pressing ring in the base.

Preferably, the base is provided with three cold shoe connectors, the connecting member is provided with cold shoe, the cold shoe is coupled to the cold shoe connector.

Preferably, the connecting member is provided with a locknut, the locknut locks the cold shoe to the cold shoe connector.

Preferably, the cold shoe connector includes a connecting portion, a screw is coupled to the connecting portion to fix the cold shoe connector on the base.

Preferably, the connecting portion extends from the surface of the base into the base, the connecting portion is sleeved with a pressing ring, the screw connects to the connecting portion while fixing the pressing ring in the base.

Compared to the prior art, the bracket for live broadcasting of the present invention has the following benefits. The clip body, the mirror and the fill light are detachably connected to the base respectively. In live broadcasting, while holding the terminal device by the clip body for live broadcasting, the fill light can be directly close to the live broadcaster. Moreover, the live broadcaster can easily know his or her expression or status by the mirror, thus making the effect of live broadcasting better.

BRIEF DESCRIPTION OF THE DRAWINGS

The present invention will be described with greater specificity and clarity with reference to the following drawings, in which.

DESCRIPTION OF THE PREFERRED EMBODIMENTS

Advantages and features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein.

Figure 1:
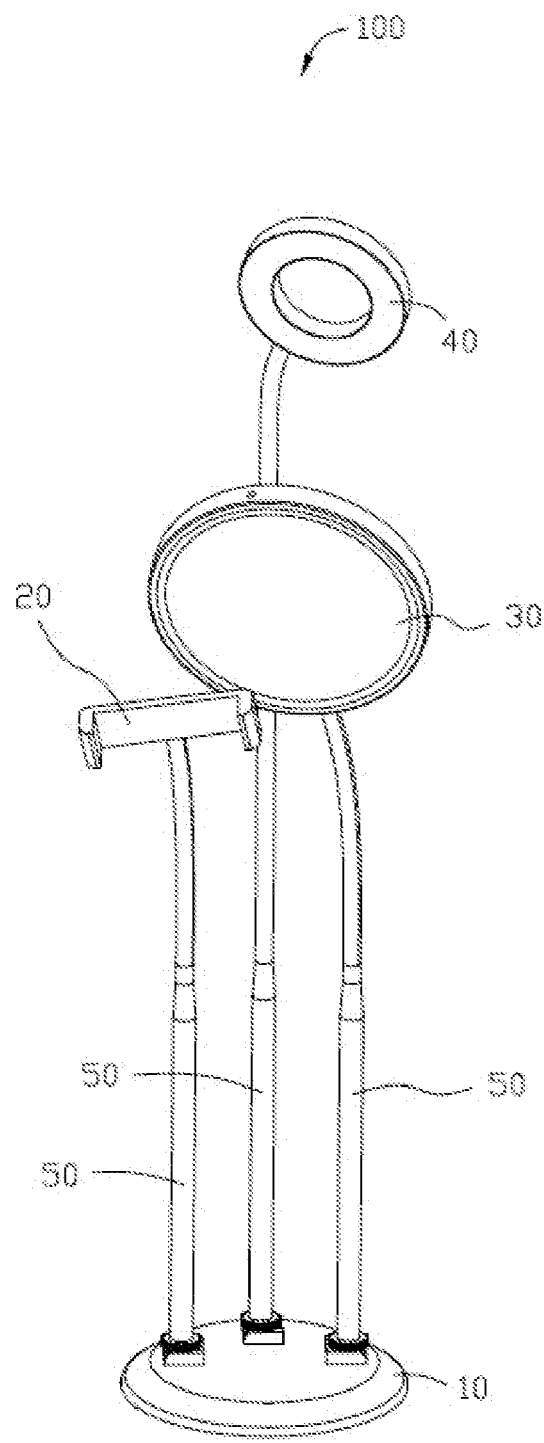
FIG. 1 is an isometric view of the bracket for live broadcasting.
Figure 2:
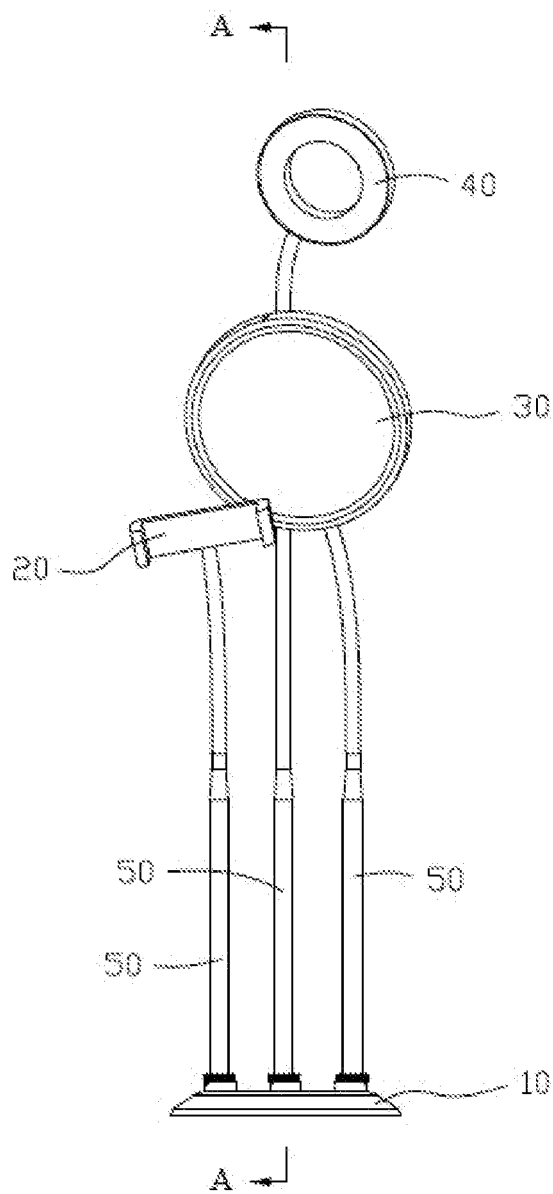
FIG. 2 is a front view of the bracket for live broadcasting.
Figure 3:
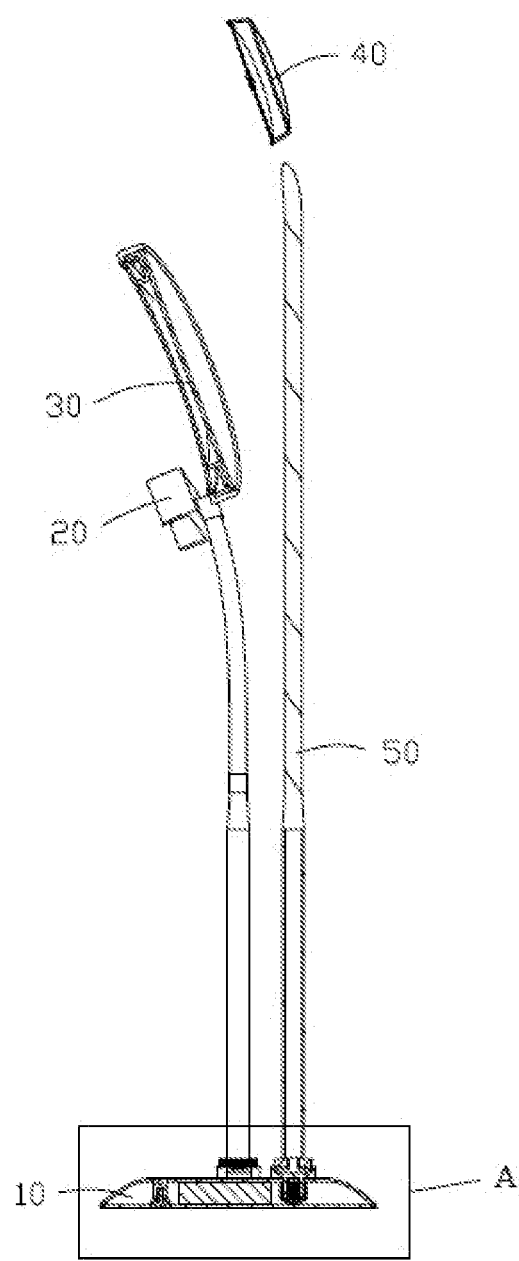
FIG. 3 is a side view cross-section of the bracket for live broadcasting of FIG. 2 along section line A-A.

Referring to FIG. 1-3. FIG. 1 is an isometric view of the bracket for live broadcasting. FIG. 2 is a front view of the bracket for live broadcasting. FIG. 3 is a side view cross-section of the bracket for live broadcasting of FIG. 2 along section line A-A. The bracket 100 includes a base 10, a clip body 20, a mirror 30 and a fill light 40. The clip body 20, the mirror 30, and the fill light 40 are detachably mounted on the base 10 respectively.

Figure 4:
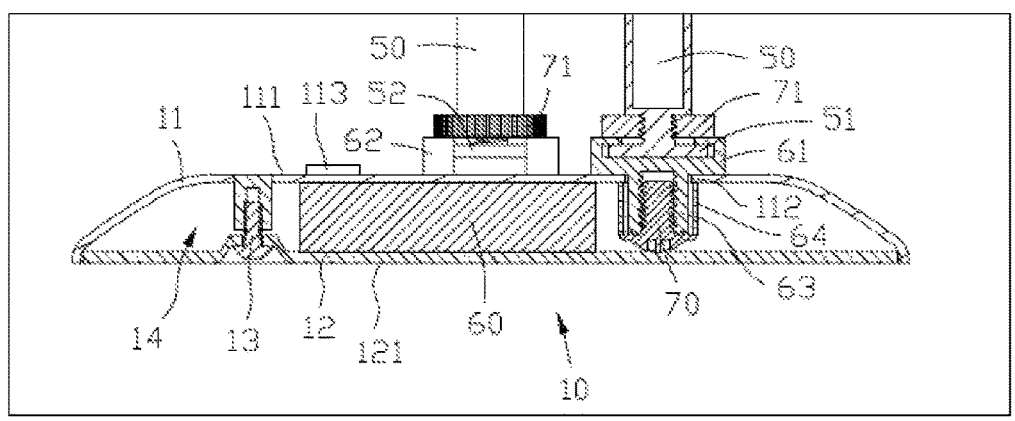
FIG. 4 is an enlarged view of the bracket for live broadcasting of FIG. 3.

Referring to FIG. 4, FIG. 4 is an enlarged view of the bracket for live broadcasting of FIG. 3. The base 10 includes an upper shell 11 and a lower shell 12. The upper shell 11 and the lower shell 12 can be detachably connected together by screws 13 to form a cavity 14. The upper shell 11 can form an upper surface 111. The lower shell 12 serves as a support shell.

As shown in FIG. 1-2. The clip body 20, the mirror 30, and the fill light 40 can be connected to the base 10 by a connecting member 50 respectively, so that the clip body 20, the mirror 30, and the fill light 40 are achieve a certain height, which is more conducive to improving the effect of the live broadcast. Preferably, the connecting member 50 can be a pipe body, so that it is convenient to arrange wires in the pipe body. Preferably, the pipe body can be bent. Thus, the height or angle of the clip body 20 or the mirror 30 or the fill light 40 can be adjusted separately according to the requirements of the live broadcast. Preferably, the pipe body is a hose.

Preferably, a rechargeable battery module 60 may be provided in the base 10. A hot shoe connector 61 and/or two cold shoe connectors 62 are fixed to the base 10. The hot shoe connector 61 is electrically connected to the rechargeable battery module 60. Specifically, the upper shell 11 defines three through holes 112. The hot shoe connector 61 and/or the cold shoe connector 62 include a connecting portion 63. The connecting portion 63 passes through the through hole 112 and extends into the base 10. a screw 70 is coupled to the connecting portion 63 to fix the hot shoe connector 61 or the cold shoe connector 62 on the base.

The connecting portion 63 is sleeved with a pressing ring 64. The screw 70 connects to the connecting portion 63 while fixing the pressing ring 64 in the base 10. Therefore, the pressing ring 64 or the screw 70 can be selected as needed to more conveniently mount the hot shoe connector 61 or the cold shoe connector 62.

The end of the connecting member 50 to which the fill light 40 requiring electric energy is connected may be connected with the hot shoe 51. The hot shoe 51 is electrically connected to the fill light 40. Therefore, the electrical energy of the rechargeable battery module 60 can be transmitted to the fill light 40 after the hot shoe 51 is connected to the hot shoe connector 61. In order to facilitate the control of the power supply of the rechargeable battery module 60, a control switch 113 may be disposed on the base 11. The switching state of the fill light 40 can be controlled by the control switch 113 when the hot shoe 51 is connected to the hot shoe connector 61. The clip body 20 and the mirror 30 don't require electrical energy. The end of the connecting member 50 to which the clip body 20 or the mirror 30 is connected may be connected with the cold shoes 52. The cold shoe 52 is coupled to the cold shoe connector 62.

Figure 5:
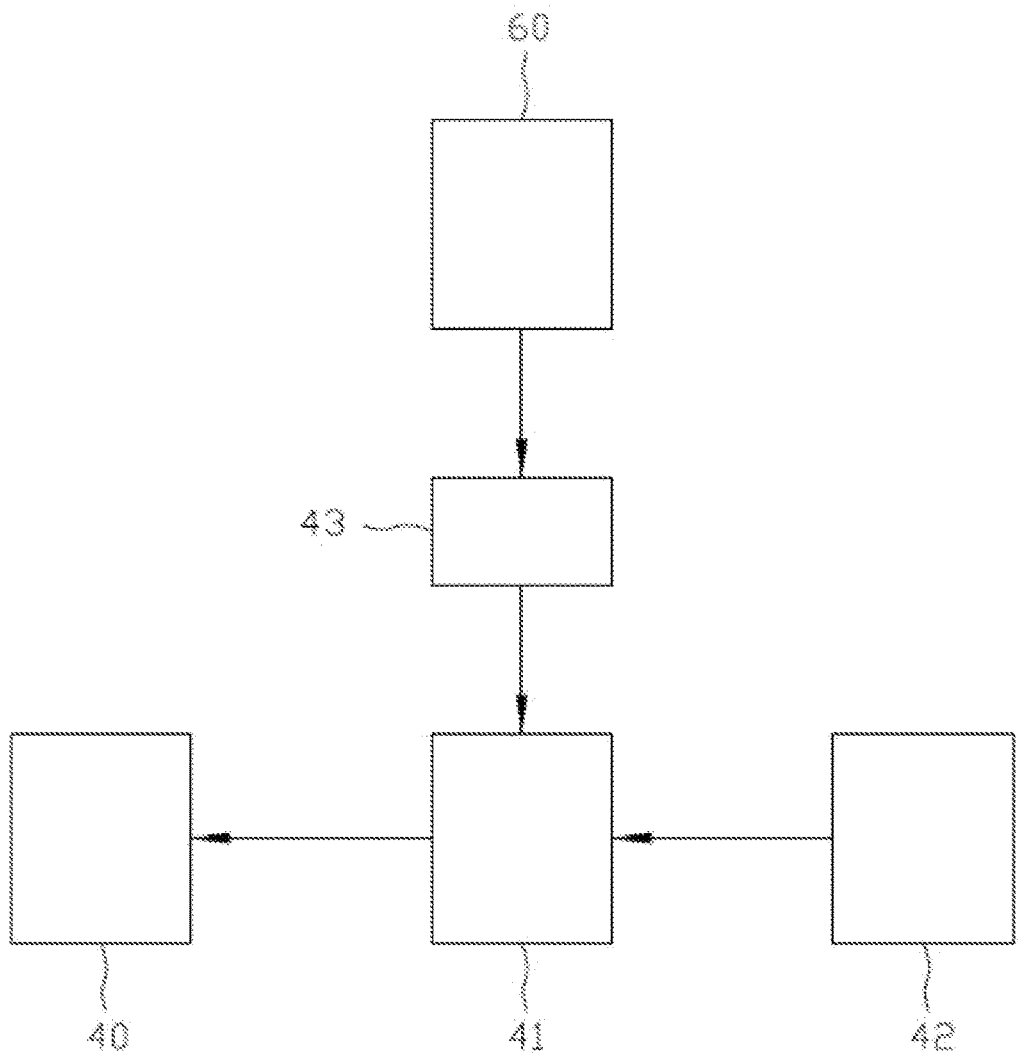
FIG. 5 is a block diagram illustrating an apparatus suitable for the bracket for live broadcasting according to an exemplary embodiment.

In another embodiment, the end of the connecting member 50 connected to the fill light 40 can also be connected to the cold shoe 52. The cold shoe 52 is detachably coupled to the cold shoe connector 62. As shown in FIG. 5, the fill light 40 is connected with a data line 41 in order to supply power to the fill light 40. The data line 41 can be connected to the charger 42 to supply power to the fill light 40. Alternatively, a charging interface 43 disposed on the base 10 is electrically connected to the rechargeable battery module 60, the data line 41 can be inserted into the charging interface 43 to deliver electrical energy of the rechargeable battery module 60 to the fill light 40.

Referring to FIG. 4. In order to make the hot shoe 51 more securely coupled to the hot shoe connector 61, or the cold shoe 52 is more securely coupled to the cold shoe connector 62, a locknut 71 is provided on the connecting member 50. The locknut 71 is rotated to change the distance between the locknut 71 and the hot shoe 51 so that the locknut 71 locks the hot shoe 51 on the hot shoe connector 61, or change the distance between the locknut 71 and the cold shoe 52 so that the locknut 71 locks the cold shoe 52 on the cold shoe connector 62.

The above only describes preferred embodiments of the present invention and is intended to reflect outstanding technical effects and advantages of the present invention, not to limit technical solutions of the present invention. Those skilled in the art should understand that all modified, changed or replaced technical features based on technical contents of the present invention should be included in a technical scope of appended claims in the present invention.

The entirety of this disclosure (including the Cover Page, Title, Headings, Field, Background, Summary, Brief Description of the Drawings, Detailed Description, claims, Abstract, Figures, and otherwise) shows by way of illustration various embodiments in which the claimed inventions may be practiced.

What is claimed is:

1. A bracket for live broadcasting comprising:
   a base;
   a clip body for holding a terminal device is detachably connected to the base;
   a mirror detachably connected to the base; and
   a fill light detachably connected to the base;
   wherein the clip body, the mirror and the fill light are detachably connected to the base by a respective connecting member;
   wherein a rechargeable battery module housed in the base, a hot shoe connector is arranged on the base, a hot shoe is arranged on the connecting member connected to the fill light, the hot shoe is coupled to the hot shoe connector to enable the rechargeable battery module to supply power to the fill light.

2. The bracket for live broadcasting as claimed in claim 1, wherein the connecting member is a pipe body.

3. The bracket for live broadcasting as claimed in claim 2, wherein the pipe body can be bent.

4. The bracket for live broadcasting as claimed in claim 3, wherein the pipe body is a hose.

5. The bracket for live broadcasting as claimed in claim 1, wherein the fill light is electrically connected to a data line.

6. The bracket for live broadcasting as claimed in claim 5, wherein a rechargeable battery module housed in the base, a charging interface disposed on the base is electrically connected to the rechargeable battery module, the data line can be inserted into the charging interface to deliver electrical energy of the rechargeable battery module to the fill light.

7. The bracket for live broadcasting as claimed in claim 1, wherein the base is provided with two cold shoe connectors, the other two of the connecting members are respectively provided with cold shoe, one of the cold shoes is coupled to one of the cold shoe connectors.

8. The bracket for live broadcasting as claimed in claim 7, wherein each of the connecting member is provided with a locknut, the locknut locks the hot shoe to the hot shoe connector or locks the cold shoe to the cold shoe connector.

9. The bracket for live broadcasting as claimed in claim 7, wherein the hot shoe connector and the cold shoe connector include a connecting portion respectively, a screw is coupled to the connecting portion to fix the hot shoe connector or the cold shoe connector on the base.

10. The bracket for live broadcasting as claimed in claim 9, wherein the connecting portion extends from the surface of the base into the base, the connecting portion is sleeved with a pressing ring, the screw connected to the connecting portion while fixing the pressing ring in the base.

11. A bracket for live broadcasting comprising:
    a base;
    a clip body for holding a terminal device is detachably connected to the base;
    a mirror detachably connected to the base; and
    a fill light detachably connected to the base;
    wherein the clip body, the mirror and the fill light are detachably connected to the base by a respective connecting member;

wherein the base is provided with three cold shoe connectors; the connecting member is provided with a cold shoe, and the cold shoe is coupled to the cold shoe connector.

12. The bracket for live broadcasting as claimed in claim 11, wherein the connecting member is provided with a locknut, the locknut locks the cold shoe to the cold shoe connector.

13. The bracket for live broadcasting as claimed in claim 12, wherein the cold shoe connector includes a connecting portion, a screw is coupled to the connecting portion to fix the cold shoe connector to the base.

14. The bracket for live broadcasting as claimed in claim 12, wherein the connecting portion extends from the surface of the base into the base; the connecting portion is sleeved with a pressing ring, the screw is connected with the connecting portion such that the pressing ring is fixed in the base.

\* \* \* \* \*